COMPUTER CONTROL

Filed Dec. 4, 1962 7 Sheets-Sheet 1

WITNESSES
Theodore F. Wrobel
Dean Schron

INVENTORS
Walter C. Borck Jr.
Robert C. Mc Reynolds
BY Ernest P. Klipfel
ATTORNEY Nov. 22, 1966 W. C. BORCK, JR., ETAL 3,287,702

COMPUTER CONTROL

Filed Dec. 4, 1962 7 Sheets-Sheet 2

COMPUTER CONTROL

Filed Dec. 4, 1962 7 Sheets-Sheet 4

United States Patent Office
3,287,702
Patented Nov. 22, 1966

3,287,702
COMPUTER CONTROL

Walter C. Borck, Jr., Arbutus, and Robert C. McReynolds, North Linthicum, Md., assignors to Westinghouse Electric Corporation, Pittsburgh, Pa., a corporation of Pennsylvania Filed Dec. 4, 1962, Ser. No. 242,233
9 Claims. (Cl. 340—172.5)

This invention in general relates to computers, and more in particular to a control for a parallel network type computer.

Modern day digital computers are severely hampered in the solution of a great many mathematical problems in that the memory portion of these computers are utilized as primary storage for both the program to be run by the computer and all of the data to be processed by the computer. There is then, a consequent data traffic problem on the wires carrying information from and to the memory unit and the other various units of the computer. Many of these mathematical problems are best adapted to be solved by a parallel type of computation rather than a time consuming sequential type of calculation. To this end, there has been proposed parallel network type computers wherein a central control unit will simultaneously control a plurality of individual and similar processing elements. The processing elements are generally arranged in a matrix type of an array and possess the capability of communicating, that is transferring information to other preselected processing elements of the array, such as its nearest neighbor processing elements. A central control means decodes instructions and provides a plurality of control signals which are fed to each processing element of the array such that each will carry out the operation as specified by the control signals on information stored within memory means associated with each processing element. These processing elements are then capable of executing, simultaneously, all logical functions upon operands stored within themselves, and if arithmetic means are provided within each processing element, a great many additional problems may be solved by the computer thus provided. Since the stored operands may represent numbers having different values, different logic or arithmetic results occur at different times. One or more processing elements may be completed with a particular problem before other processing elements of the array, and since all of the processing elements are operating in the same mode of operation, the finished processing elements must still execute the commands as designated by the control signals from the central control means. This type of operation is satisfactory for a great number of operations, however, a greater number of problems may be solved, at greater speeds, by having different processing elements work on different sectors of a particular problem.

It is, therefore, one object of the present invention to provide a parallel network computer which can solve a greater variety of problems than heretofore.

Another object is to provide a parallel network computer which has a greater programming flexibility than those heretofore.

Still another object is to provide a control for a computer having a plurality of processing elements under simultaneous control of a central control unit, which control, will allow different modes of operation of the processing elements.

Still another object is to provide a control for a computer having a plurality of processing elements under simultaneous control of a central control unit, which control, will allow the processing elements to operate in the same mode of operation.

It is a further object to provide a control for a parallel network computer which will allow different parts of a problem to be solved by different processing elements of the computer.

Yet another object is to provide a control for a computer having a plurality of processing elements under simultaneous control of a central control unit, which control, will allow different modes of operation according to data internal to the processing element.

Briefly, in accordance with the above objects, the broad concept of the invention comprises circuit means associated with the processing elements of a parallel network computer, which circuit means, is responsive to internal conditions within the processing element for allowing the processing element to alter the control signals received from a central control means such that the processing element may be in a different mode of operation than other processing elements of the array if the conditions are met. The objects, and the basic concept, are accomplished in the present invention, one illustrative embodiment of which comprises coding means for one or more processing elements of the array operable to provide a coded output signal representing a particular mode of operation. Decoding, or gating means, are provided for receiving mode indicating signals from the central control means in addition to the coded output signal from the coding means, to provide a first control signal if the coded output signal represents the same mode of operation as the mode indicating signal or signals designate. Means are additionally provided to change the coded output signal and thereby change the mode of operation indication, and functions in response to instructions from the central control means, or in response to internal conditions within the processing elements. If the first control signal is provided, it may be used to alter the control signals received by the processing element from the central control means. It may be seen, therefore, that by addressing the processing element with all possible mode indicating signals from the central control means, all of the processing elements will carry out the commands designated. By addressing the processing element with less than the full complement of mode indicating signals, only a portion of the plurality of processing elements of the array will carry out the command designated.

The above stated and further objects of the present invention will become apparent upon a reading of the following detailed specification taken in conjunction with the drawings, in which.

Figure 1:
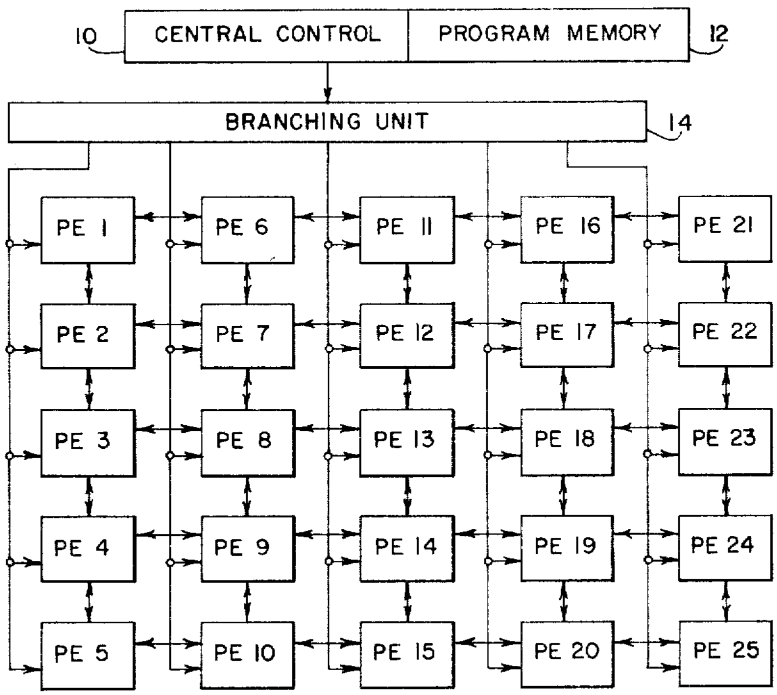
FIGURE 1 is a block diagram illustrating a basic array of processing elements under simultaneous control of a central control unit.

Referring now to FIG. 1, there is shown a typical array of processing elements, with the processing elements labeled PE1 to PE25. Although the square array shown comprises twenty five processing elements, more or fewer, processing elements may be utilized in other predetermined arrays. Each processing element has the ability to communicate with predetermined other processing elements in the array and by way of example, FIG. 1 shows each processing element communicating with its nearest neighbors. In the computer described herein each processing element is under simultaneous control of a central control unit 10 having an associated program memory 12. Basically, the central control unit contains program memory 12, has the means to retrieve and interpret stored instructions, and the capability to cause execution of these instructions within the array. Since identical control signals are sent to the processing elements from the central control unit, it may be necessary to branch the information and provide proper amplification and power. To this end, there may be provided a branching unit 14 which accepts the signals from the central control unit 10 and transmits it at a higher power level to all of the processing elements in the array.

Figure 2:
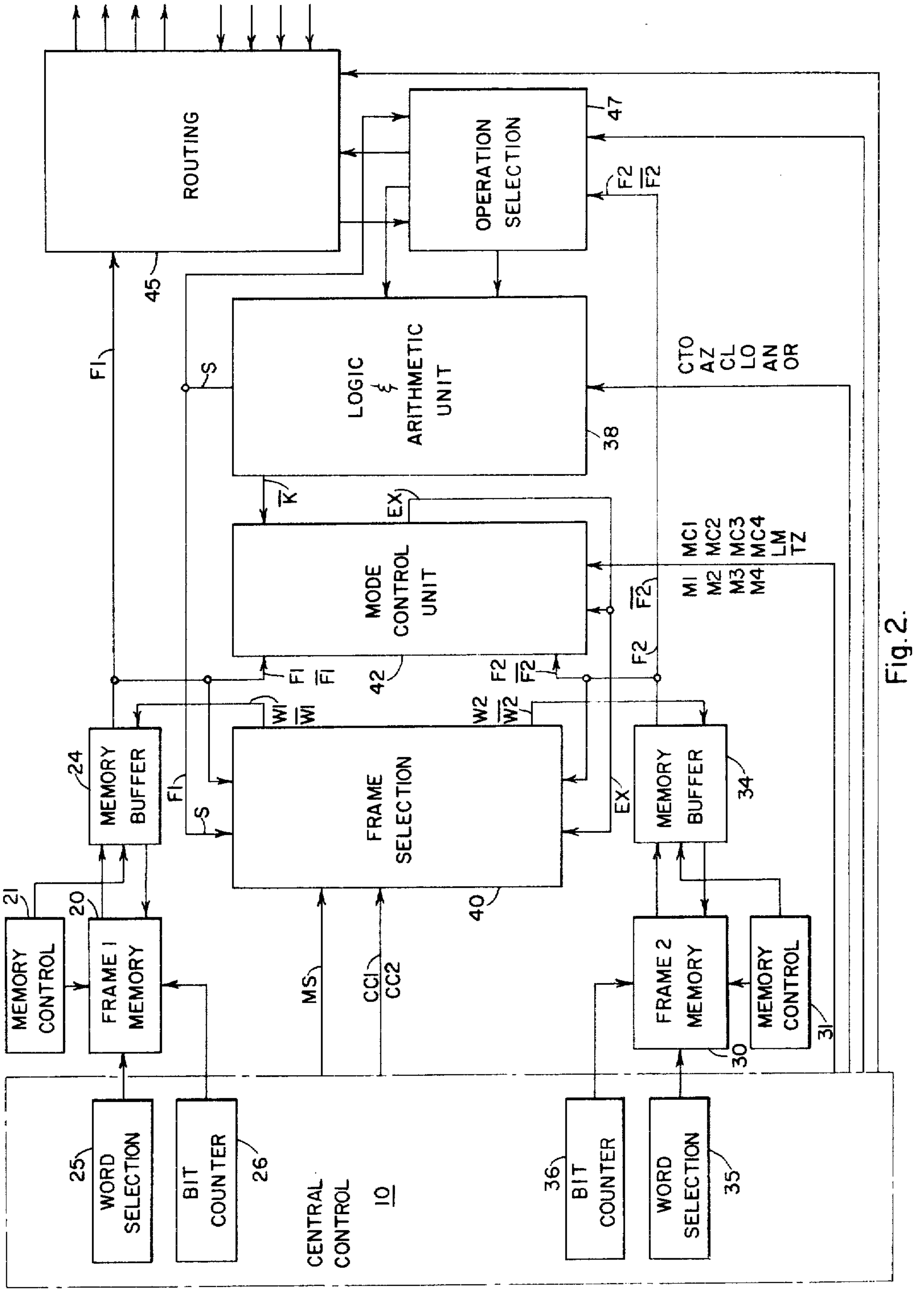
FIG. 2 is a block diagram illustrating a typical processing element.

Since all of the processing elements in the array are similar, a typical processing element will be described with respect to FIG. 2. The processing element includes a frame 1 memory 20 and a frame 2 memory 30, with each of these memory frames having the ability to store a plurality of multibit words, and a typical memory may have the capacity to store several thousand bits. Associated with the frame 1 memory 20 is a memory control unit 21 and a memory buffer 24. The memory control unit 21 may be operable to supply signals to the frame 1 memory 20 for reading and writing information, in addition to supplying timing and inhibiting pulses to the memory buffer 24. In the like manner memory control unit 31 is operable to control the frame 2 memory 30 in addition to the memory buffer 34. The memory controls 21 and 31 perform their function upon receipt of control signals from the central control unit 10. In order to address the memory frames, there is provided a word selection unit 25 for selecting a predetermined word in the frame 1 memory 20, and a bit counter unit 26 for selecting desired bits in the word selected. The word selection unit 35 operating in conjunction with the bit counter unit 36 in a like manner serves to address the frame 2 memory 30. The word selection units and the bit counter units are diagrammatically shown to be in the central control unit 10. In order to perform desired logic operations and desired arithmetic operation there is provided a logic and arithmetic unit 38 which is capable of performing serial by bit arithmetic operations on information stored in the memory frames. The results of any logic or arithmetic operation may be selectively stored in either frame 1 memory 20 or the frame 2 memory 30. The frame selection means 40 is operable to perform this selective storage operation. The frame selection means 40 is additionally operable to transfer information between memory frames, that is information in the frame 1 memory 20 may be transferred to the frame 2 memory 30, and information in the frame 2 memory 30 may be transferred to the frame 1 memory 20. As was stated, each processing element in the array is capable of communication with other preselected processing elements in the array. Routing means 45 is provided and is operable to route information in the frame 1 memory 20 to the associated processing element or to one of four nearest neighbors upon receipt of predetermined control signals from the central control unit 10. Routing means 45 is additionally operable to receive information from the frame 1 memories of the four nearest neighbors. Although only one routing means is shown which operates to transfer information from the frame 1 memory, routing means could also be provided for the frame 2 memory 30. Operation selection means 47 is provided to not only control the logic and arithmetic unit 38 during certain operations but also to pass preselected bits or their complements, involved in the operations, and which bits may be located in the frame 1 memory 20, the frame 2 memory 30, or the frame 1 memory of a neighboring processing element. The various units shown in FIG. 2 are all under control of the central control unit 10 and the various connections shown are labeled with different signals which will be explained hereinafter.

The parallel network computer, and the processing element thus described, are more fully shown and described in a copending application by Daniel Slotnick Serial No. 242,234, filed concurrently herewith. The subject invention finds use with such a system described, and is shown in FIG. 2 as the mode control unit 42 which receives a plurality of control signals from the central control unit 10 and is responsive to conditions within the processing element, which conditions may be represented by the F1, F2, $\overline{K}$ etc., signals shown. The mode control unit 42 operable to provide a first control signal EX to alter commands specified by the central control unit 10 in a manner to be hereinafter described.

Figure 3:
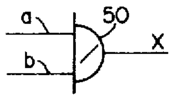
FIGS. 3, 4 and 5 are diagrammatic representations of logic elements which may be used in the present invention.
Figure 4:
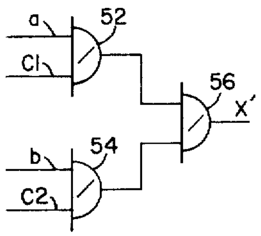
Figure 5:
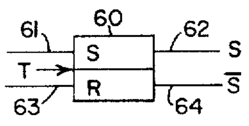

Before explaining the detailed operation of the processing element, reference should be made to FIGS. 3, 4 and 5 which show several types of logic circuits which may be used herein, although it is to be understood that the invention is not limited thereto. FIG. 3 shows a symbol for a STROKE gate which is the common NOT-AND (NAND) circuit. The STROKE gate 50 of FIG. 3 may include a plurality of inputs, of which two are shown, one having the input signal *a* and the other having the input signal *b*; an output signal is indicated as *x*. In familiar binary form, the STROKE gate 50 will provide a ONE output signal if any of its input signals are ZEROS, and will provide a ZERO output signal only if all of its input signals are ONES. The basic STROKE gate 50 of FIG. 3 may be utilized in a gating arrangement shown in FIG. 4 comprising STROKE gates 52, 54 and 56. Assume by way of example that the signals *a*, C1, *b*, and C2 are all ZEROS. The STROKE gates 52 and 54 will then be providing ONE signals to the STROKE gate 56 which provides a ZERO output signal. If it is desired to gate one of the signals *a* or *b* such that it appears as an output signal *x'*, a control signal C1 or C2 may be energized to provide a ONE signal. If the signal C1 is made a ONE then the STROKE gate 52 is enabled to pass the *a* signal through to appear at the output *x'*. With the signal C2 being a ZERO, the STROKE gate 54 is providing a ONE input signal to the STROKE gate 56 and if the *a* signal is a ONE the STROKE gate 56 will provide a ONE output signal, and if the *a* signal is a ZERO, the STROKE gate 56 will provide a ZERO output signal. With C1 a zero, STROKE gate 52 provides an enabling ONE signal to STROKE gate 56 and by making C2 a ONE, the *b* signal will appear as the output of STROKE gate 56. Thus it is seen that with the STROKE gating arrangement shown in FIG. 4 either one of the signals *a* or *b* may be passed through to the output *x'* by the application of a proper control signal. FIG. 5 shows a symbol which will be utilized herein to symbolize a FLIP-FLOP device. The FLIP-FLOP 60 is shown to have two sides, a set (S) side and a reset (R) side. A ONE signal on input 61 to the set side will cause a ONE on the output 62, and this output signal is indicated as S. The output 64 from the reset side will then be the complement of the S signal that is, a ZERO. A ONE signal on input 63 to the reset side will cause a ONE on the output 64 and this signal is indicated as $\overline{S}$. With a ONE appearing on output 64, output 62 will then be providing a ZERO signal. Generally, in most electronic computers the pulses, or signals, appearing are synchronized with respect to each other by means of clock pulses generated by a clock within the computer. The FLIP-FLOP 60 is shown to have an additional input T to indicate that some sort of timing, or clock pulse is applied to the FLIP-FLOP, the presence of such timing pulse enabling the FLIP-FLOP 60 to function to provide output signals.

Figure 6A:
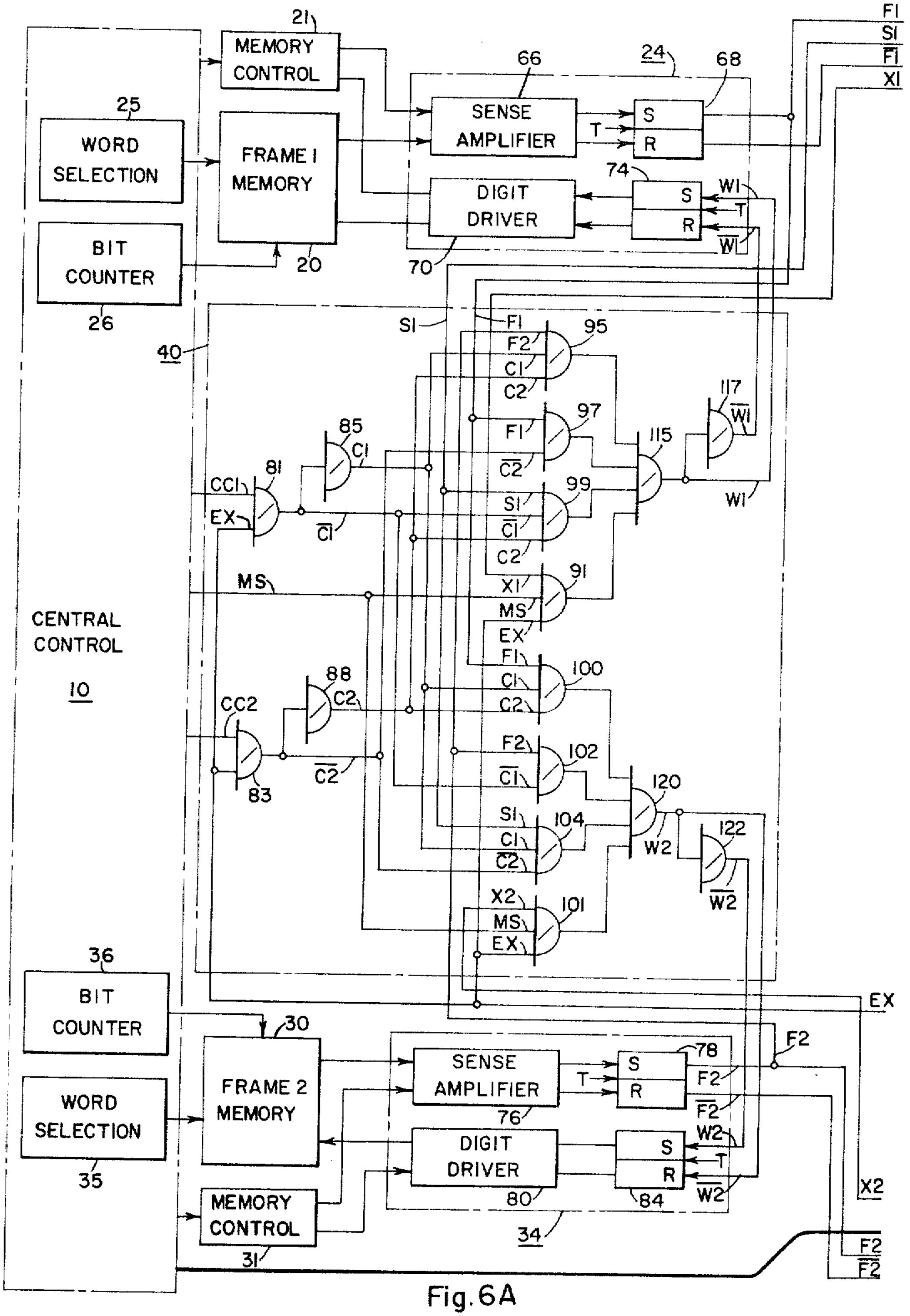
FIGS. 6A, 6B, 6C and 6D are schematic electrical diagrams illustrating the processing element of FIG. 2 in more detail.

For a detailed explanation of the operation of a processing element, reference should now be made to FIGS. 6A, 6B, 6C and 6D which when placed side-by-side in order, constitute a complete circuit of a typical processing element although it is to be understood that the invention is equally operable with processing elements other than that specifically described herein. FIG. 6A shows in more detail the memory buffers 24 and 34, and the frame selection means 40. A predetermined bit in the frame 1 memory 20 is chosen by the word selection unit 25 and the bit counter 26 and when so selected the memory control unit 21 provides the necessary read write wave form. In order to sense the bit being read out of the frame 1 memory 20 there is provided a sense amplifier 66 which is operable, when enabled by a strobe pulse from the memory control unit 21 to sense a bit being read out and cause the FLIP-FLOP 68 to provide this bit as an output signal. The FLIP-FLOP 68 provides the F1 signal and the following notations will be utilized to denote the following signals:

$F1$=the bit read out of the frame 1 memory 20

$\overline{F1}$=the complement of the bit read out of the frame 1 memory 20

$F2$=the bit read out of the frame 2 memory 30

$\overline{F2}$=the complement of the bit read out of the frame 2 memory 30.

$W1$=the bits to be read into the frame 1 memory 20

$\overline{W1}$=the complement of $W1$ $W2$=the bit to be read in the frame 2 memory 30

$\overline{W2}$=the complement of $W2$

In order to write a bit back into the frame 1 memory there is provided a digit driver 70 which is inhibited from operation until the desired time by an inhibit signal from the memory control unit 21. This digit driver will write a bit into the frame 1 memory 20 in accordance with an output from the FLIP-FLOP 74 which output is determined by the W1 input signal to the FLIP-FLOP 74. The memory buffer 34 is similar to the memory buffer 24 in that it comprises a sense amplifier 76 for reading a bit of the frame 2 memory 30, a FLIP-FLOP 78 for providing the bit read out as a signal F2 and $\overline{F2}$, a digit driver 80 for writing a bit back into the frame 2 memory 30, and a FLIP-FLOP 84 which will be set in accordance with the W2 or $\overline{W2}$ signal to provide the bit for the digit driver 80. In like manner, the sense amplifier is under the control of a strobe pulse from the memory control 31 and the digit driver 80 is inhibited from operation until the proper time by an inhibit signal from the memory control 31.

The flexibility of the processing element shown is greatly enhanced by the fact that the results of any logic or arithmetic operation may be placed in either one of the memory frames 20 or 30 in addition to the fact that information in the memory frames may be exchanged with one another. The frame selection means 40 provides the necessary control circuitry to perform the functions in response to the proper predetermined control signals from the central control unit 10. In FIG. 6A there is shown two conductors labeled CC1 and CC2 entering STROKE gates 81 and 83 of the frame selection means 40. These STROKE gates additionally receive the first control signal EX from the mode control unit 42 which, when present, will enable STROKE gates 81 and 83 to pass the CC1 and CC2 signals. With the EX signal present (that is, a ONE) STROKE gate 81 will produce an output-signal which is the complement of CC1 and is designated as $\overline{C1}$. STROKE gate 85 will complement the output of STROKE gate 81 and the output signal from STROKE gate 85, designated C1, will be a reproduction of the CC1 signal. In the like manner, STROKE gate 83 will produce a $\overline{C2}$ signal and inverting STROKE gate 88 will produce a C2 signal which is a reproduction of the CC2 signal. With the EX signal not present (that is, a ZERO) STROKE gates 81 and 83 are blocked and the $\overline{C1}$ and $\overline{C2}$ signals will remain ONES while the C1 and C2 signals will remain ZEROS. With the EX signal a ONE, a first storage signal may be provided by making CC1 and CC2 both ONES. In this instance, the bit read from the frame 1 memory 20 is transferred to the frame 2 memory 30, and the bit read from the frame 2 memory 30 is transferred to the frame 1 memory 20. A second storage signal may be provided by making CC1 a ONE and CC2 a ZERO. In this instance, the results of any logic or arithmetic operation are stored in the frame 2 memory 30 and the bit read out of the frame 1 memory 20 is returned. A third storage signal may be provided by making a CC1 a ZERO and C2 a ONE. In this instance, the result of any logic or arithmetic operation is stored in the frame 1 memory 20 and any bit read out of the frame 2 memory 30 is returned. These operations may be demonstrated by making reference to the STROKE gates located within the frame selection means 40. The STROKE gate 95 receives the F2 signal from FLIP-FLOP 78 in addition to the C1 and C2 signals. The STROKE gate 97 receives the F1 signal from FLIP-FLOP 68 in addition to the $\overline{C2}$ signal. The STROKE gate 99 receives the results of any logic or arithmetic operation, designated as S1, in addition to the $\overline{C1}$ signal and the C2 signal. As was stated, each processing element may be in a particular mode of operation, and in many instances it is desirable to store that particular mode of operation such that the processing element may return to it at a later time. To this end, there is provided a STROKE gate 91 which receives a mode store signal, MS from the central control means 10, and the first control signal EX from the mode control unit 42, in addition to an X1 signal which is indicative of the present mode of operation, and which signal will be explained with respect to FIG. 6B. The outputs of STROKE gates 95, 97, 99 and 91 are fed to a STROKE gate 115 which will then provide the W1 signal to the FLIP-FLOP 74, and STROKE gate 117 will provide the $\overline{W1}$ signal to the FLIP-FLOP 74. STROKE gate 100 receives the F1 signal from the FLIP-FLOP 68 in addition to the C1 and C2 signals, STROKE gate 102 receives the F2 signal from the FLIP-FLOP 78 in addition to the $\overline{C1}$ signal, and the STROKE gate 104 receives the S1 signal in addition to the C1 and $\overline{C2}$ signals. STROKE gate 101 functioning in a manner similar to STROKE gate 91 receives the mode store signal MS from the central control means and the EX signal from the mode control unit 42. In addition, an X2 signal from the mode control unit 42 is provided, and like the X1 signal is indicative of the present mode of operation. The outputs from STROKE gates 100, 101, 102 and 104, are fed to STROKE gate 120 which will then provide the W2 signal to the FLIP-FLOP 84, and STROKE gate 122 will provide the $\overline{W2}$ signal to the FLIP-FLOP 84. Thus, it may be seen that with the EX signal present, the frame selection means 40 will be enabled and the W1 signal from STROKE gate 115 may represent, depending upon the combination of CC1 and CC2 signals, the F2 bit or the F1 bit or the S1 bit or the X1 signal indicative of the present mode of operation. In a similar manner the W2 signal from STROKE gate 120 may represent the F1 bit or the F2 bit or the S1 bit or the X2 signal indicative of the present mode of operation of the processing element. With the EX signal a ZERO, the frame selection means 40 operates to return the F1 bit to the frame 1 memory and the F2 bit to the frame 2 memory regardless of the CC1 and CC2 signals. The first control signal EX, therefore, in this embodiment functions to alter control signals CC1 and CC2 from the central control means 10.

The bits F1 and F2 as provided by FLIP-FLOP 68 and 78 may represent the bits of a word stored in the memory frames upon which an operation is to be performed. This operation may be performed in the associated processing element or in the processing element of a neighbor as heretofore described. To this end, reference is now made to FIG. 6D.

Figure 6B:
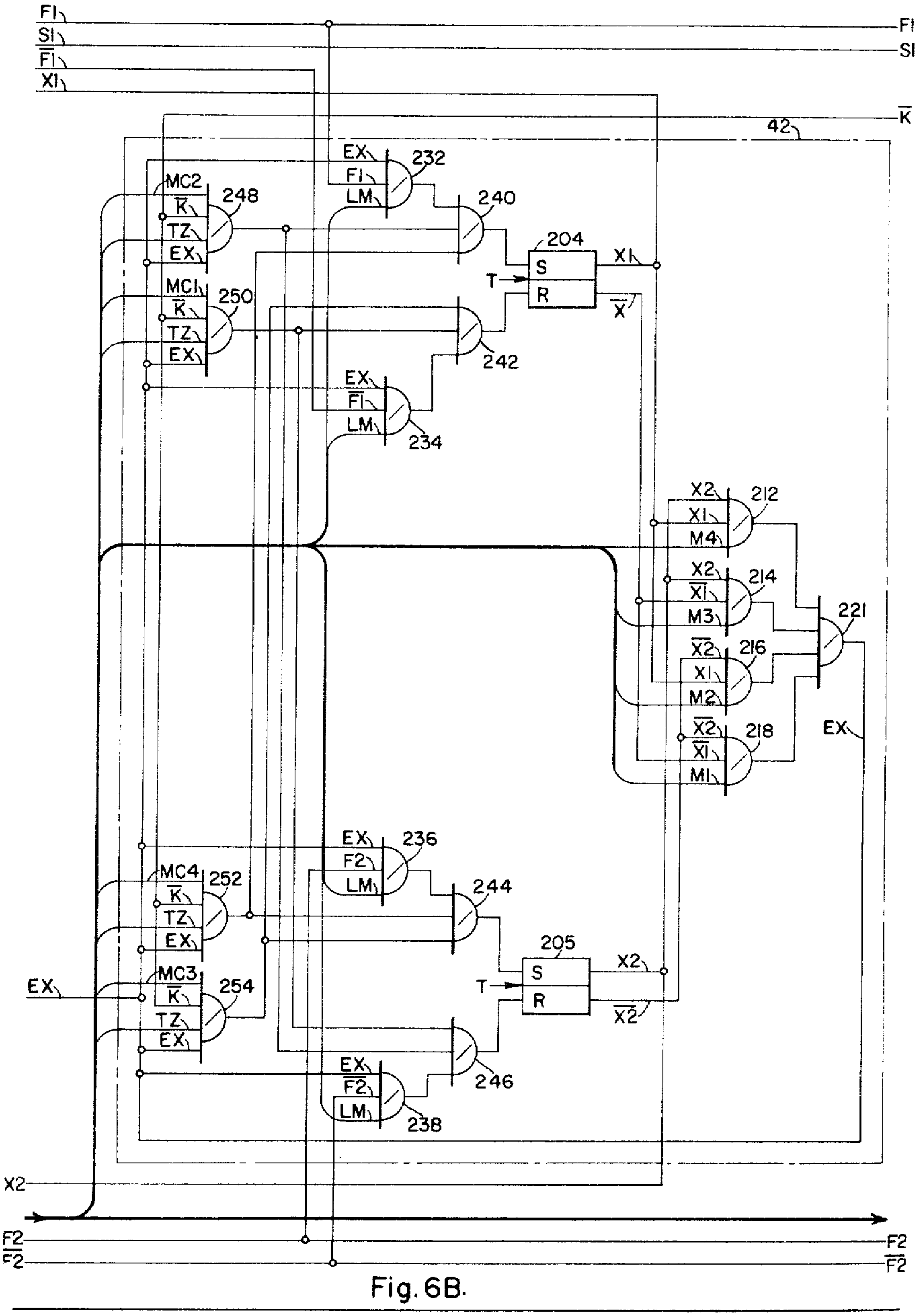
Figure 6C:
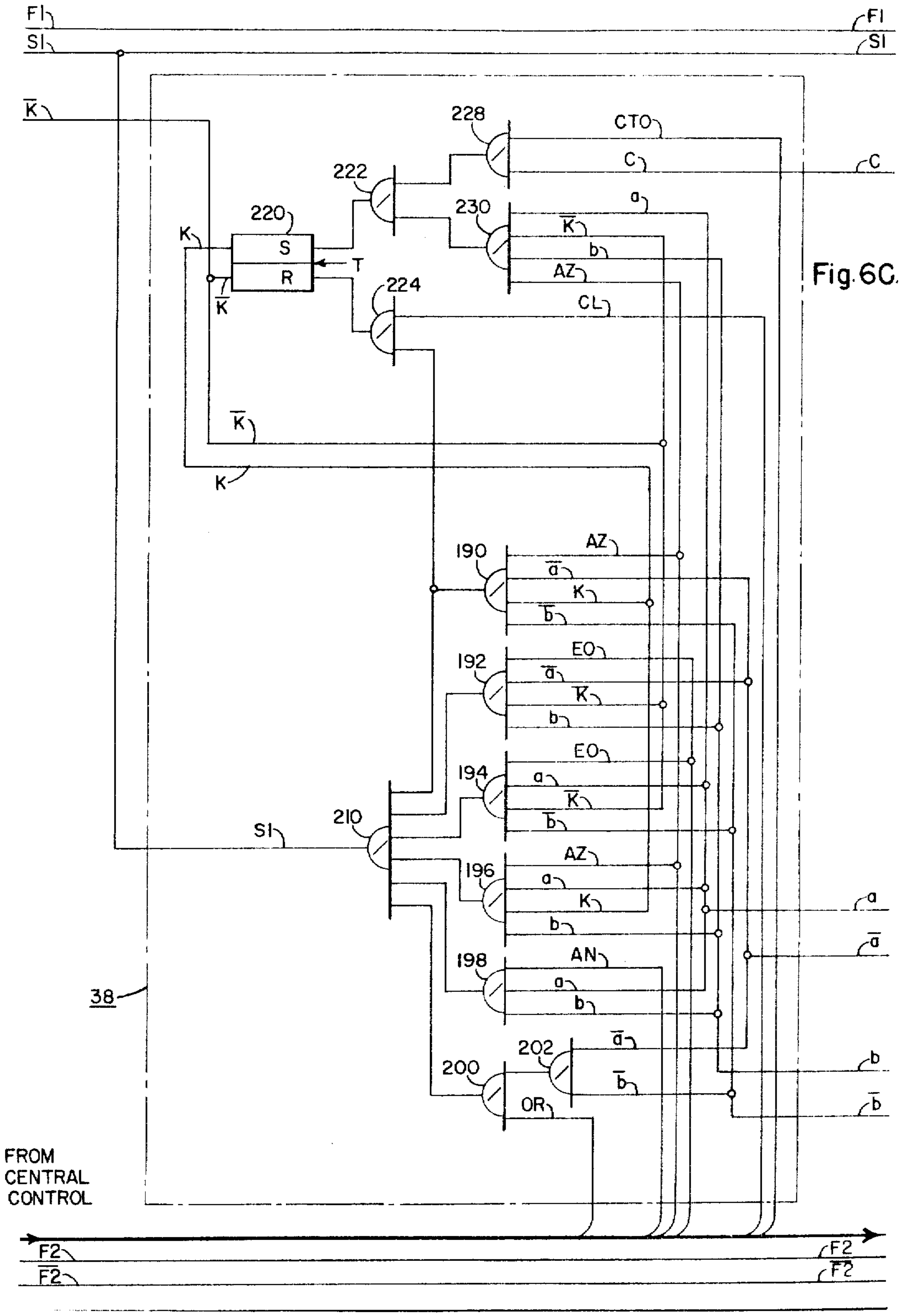
Figure 6D:
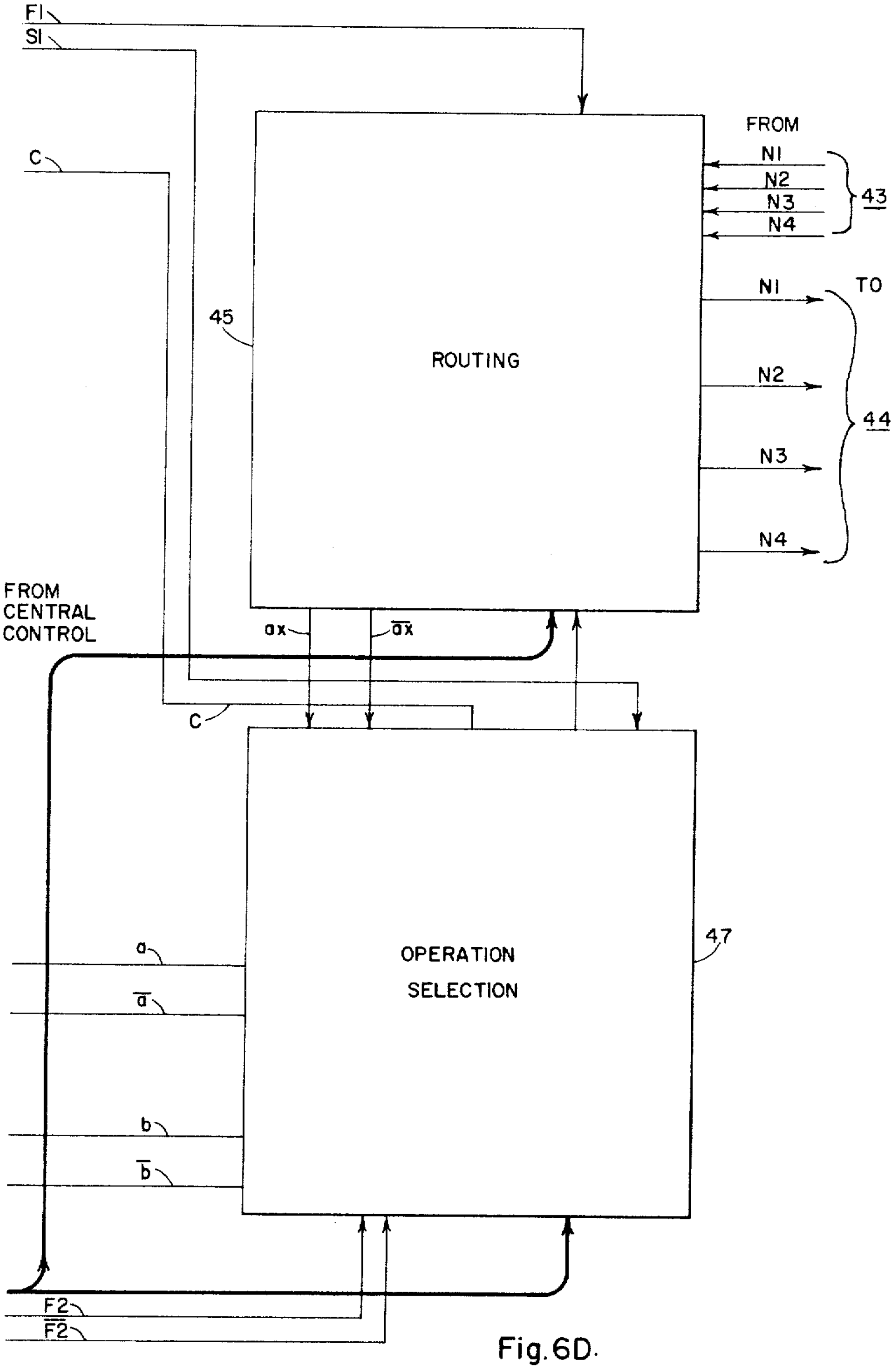

In FIG. 6D, there is shown routing means 45 which functions, upon receipt of predetermined control signals from the central control means, to route the F1 bit to the associated processing element or to the nearest neighbor processing elements via one of the conductors in the group designated 44. If routing to a nearest neighbor is designated, routing means 45 is operable to receive the F1 bit from a nearest neighbor via a conductor in the group designated 43. Two signals, designated *ax* and $\overline{ax}$ are provided by the routing means 45 to the operation selection means 47. The signal *ax* represents the F1 bit read out of a frame 1 memory either from the associated processing element or a neighboring processing element, and the signal $\overline{ax}$ represents its complement. One of the functions of the operation selection means 47 is to receive the *ax* and $\overline{ax}$ signal in addition to the F2 bit and its complement from the FLIP-FLOP 78 of FIG. 6A and will, upon instructions from the central control means 10, provide the F1 bit as the signal *a* and the F2 bit as the signal *b*, in addition to their complements $\overline{a}$ and $\overline{b}$. Internal to the operation selection means 47 may be circuit means operable such that the *a* signal provided is in actuality the complement of the F1 bit and the *b* signal provided is the complement of the F2 bit. A more detailed explanation of the routing means 45 and the operation selection means 47 may be found in the aforementioned copending application. With the *a* bit or its complement thus obtained and the *b* bit or its complement thus obtained a logic or arithmetic operation may be performed and to this end reference is now made to FIG. 6C which shows in more detail the logic and arithmetic unit 38 of FIG. 2.

Included in the logic and arithmetic unit 38 is a plurality of STROKE gates 190, 192, 194, 196, 198 and 200 the outputs of which are fed into a single STROKE gate 210, which provides the S1 signal, which signal is fed to STROKE gates 99 and 104 of the frame selection means 40 as previously described and to the operation selection means 47. A carry FLIP-FLOP 220 is provided and may be utilized to indicate certain conditions within the processing element and in various arithmetic and logic operations. The carry FLIP-FLOP 220 includes control circuitry comprising STROKE gate 222 which receives the outputs from STROKE gates 228 and 230, to control the set side of the carry FLIP-FLOP 220, and STROKE gate 224 which controls the reset side of the carry FLIP-FLOP 220. The *a* and the $\overline{a}$ signal and the *b* and the $\overline{b}$ signal from the operation selection means 47 are fed to various STROKE gates of the logic and arithmetic unit 38 such that STROKE gate 230 receives the *a* and the *b* signal, STROKE gate 190 receives the $\overline{a}$ and the $\overline{b}$ signal, STROKE gate 192 receives the $\overline{a}$ and the $\overline{b}$ signal, STROKE gate 194 receives the *a* and the $\overline{b}$ signal, STROKE gate 196 receives the *a* and the *b* signal, STROKE gate 198 receives the *a* and the *b* signal, and STROKE gate 202 receives the $\overline{a}$ and the $\overline{b}$ signal. In addition the output signal K, and its complement $\overline{K}$, from the carry FLIP-FLOP 220 are fed to various STROKE gates such that the STROKE gate 230 receives the $\overline{K}$ signal, STROKE gate 190 receives the K signal, STROKE gate 192 receives the $\overline{K}$ signal, STROKE gate 194 also receives the $\overline{K}$ signal, and STROKE gate 196 receives the K signal. The $\overline{K}$ signal is additionally fed to the mode control unit 42 as will be described. STROKE gate 228 receives the C signal from the operation selection means 47 in addition to a CTO signal from the central control unit 10, which CTO signal, when the C signal is a ONE, will serve to set the carry FLIP-FLOP 220 by providing a ZERO output from STROKE gate 228 which causes the STROKE gate 222 to provide a ONE signal to the set side of the carry FLIP-FLOP 220. STROKE gate 230 is also operable to set the carry FLIP-FLOP 220 in certain operations and the additional signals received by STROKE gate 230 is the $\overline{K}$ signal from the reset side of the carry FLIP-FLOP 220 and an AZ signal from central control which is energized, that is made a ONE, during certain operations. The resetting of the carry FLIP-FLOP 220 is accomplished by the STROKE gate 224 which receives the output signal from STROKE gate 190 in addition to a CL signal from the central control unit 10 which signal is normally a ONE, and when made a ZERO will reset the carry FLIP-FLOP 220. The AZ signal from the central control unit 10 which was fed to the STROKE gate 230 is additionally fed to STROKE gates 190 and STROKE gate 196. STROKE gates 192 and 194 receive an EO signal which is utilized during EXCLUSIVE OR OR signal to STROKE gate 200 is utilized during logical 198 is utilized during logical AND operations and the OR signal to STROKE gate 200 is utilized during logical OR operations.

For a more detailed explanation of the present invention, reference should now be made to FIG. 6B which shows one embodiment of a mode control means which may be utilized herein. In order to indicate the mode in which the processing element is operating, there is provided coding, or register means, the coded output signal of which is indicative of a particular mode of operation. This coding means takes the form of FLIP-FLOPS 204 and 205. The combination of binary output signals from the FLIP-FLOPS 204 and 205 indicates four different modes of operation in accordance with the following table:

| X1 | $\overline{X1}$ | X2 | $\overline{X2}$ | Mode |
|---|---|---|---|---|
| 0 | 1 | 0 | 1 | 1 |
| 1 | 0 | 0 | 1 | 2 |
| 0 | 1 | 1 | 0 | 3 |
| 1 | 0 | 1 | 0 | 4 |

Although, only two FLIP-FLOPS are shown, it is understood that more may be added thereby allowing a greater variety of coded output signals and therefore more modes of operation. In order to decode the output signals from FLIP-FLOPS 204 and 205 and compare it with mode indicating signals from the central control means, there is provided decoding means taking the form of STROKE gates 212, 214, 216 and 218. STROKE gate 212 receives the X2 output from FLIP-FLOP 205 and the X1 output from FLIP-FLOP 204 in addition to a mode indicating signal designated as M4. STROKE gate 214 receives the X2 signal from FLIP-FLOP 205, the $\overline{X1}$ signal from FLIP-FLOP 204 in addition to the mode indicating M3 signal. STROKE gate 216 receives the $\overline{X2}$ signal from FLIP-FLOP 205, the X1 signal from FLIP-FLOP 204 in addition to the mode indicating M2 signal, and STROKE gate 218 receives the $\overline{X2}$ signal from FLIP-FLOP 205, the $\overline{X1}$ signal from the FLIP-FLOP 204 in addition to the mode indicating M1 signal. The outputs from the STROKE gates of the decoding means are fed to a single STROKE gate 221 which will then provide a first control signal designated as EX.

In many operations, it is desirable to store the mode of operation and return to it at a later time. Since the X1 signal from FLIP-FLOP 204 and the X2 signal from FLIP-FLOP 205 are indicative of the mode of operation, these signals are fed back to STROKE gates 91 and 101, respectively, of the frame selection means 40 of FIG. 6A, where they may be stored in the frame 1 memory 20 and the frame 2 memory 30. By way of example, if the processing element is in mode 1, the X1 signal from FLIP-FLOP 204 will be a ZERO and the X2 signal from FLIP-FLOP 205 will be a ZERO in accordance with the above table. By examining the signals appearing on STROKE gates 212, 214, 216 and 218, it may be seen that STROKE gates 212, 214 and 216 all provide ONE output signals due to the presence of at least one ZERO input signal. STROKE gate 218 is enabled by the $\overline{X1}$ and $\overline{X2}$ signals, both of which are ONES. If the mode indicating signal M1 from the central control unit 10 is now made a ONE, STROKE gate 218 will provide a ZERO signal to STROKE gate 221 which will then produce the EX signal having a value of ONE. If instead of the M1 signal from the central control, the M3 signal was energized, each of the STROKE gates 212, 214, 216 and 218 would provide ONE signals to the STROKE gate 221 and the EX signal therefore would not be present. If it is desired to have the EX signal present for a particular operation, the mode indicating signals M1, M2, M3 and M4 may all be energized and in that instance any coded output signal from FLIP-FLOPS 204 and 205 will present enabling signals to at least one of the STROKE gates 212 or 214 or 216 or 218 to thereby cause STROKE gate 221 to provide the EX signal. The mode indicating FLIP-FLOPS 204 and 205 may be set in a variety of ways and means are accordingly provided to so set them. One method is to set the FLIP-FLOPS 204 and 205 in accordance with information in the frame 1 and the frame 2 memories. This information may by way of example, represent an initial mode to which the processing element is to be set, or it may represent a return to a mode that was previously stored in the memory. To this end, there is provided STROKE gates 232, 234, 236 and 238. Each of these STROKE gates receives a load mode signal designated as LM from the central control unit and the EX signal from STROKE gate 221. In addition, STROKE gate 232 receives the F1 bit from the read FLIP-FLOP 68 (FIG. 6A), STROKE gate 234 receives the $\overline{F1}$ bit, STROKE gate 236 receives the F2 bit from read FLIP-FLOP 78, and STROKE gate 238 receives the $\overline{F2}$ bit. The outputs from STROKE gates 232, 234, 236 and 238 are fed, respectively, to STROKE gates 240, 242, 244 and 246 with the output from STROKE gate 240 used to energize the set side of FLIP-FLOP 204 and the output from STROKE gate 242 used to energize the reset side of FLIP-FLOP 204. In a similar manner, the output of STROKE gate 244 is utilized for the setting of FLIP-FLOP 205, and the output of STROKE gate 246 is used for the resetting of FLIP-FLOP 205. Suppose by way of example that the F1 bit is a ONE and the F2 bit is a ZERO ($\overline{F1}$ therefore is ZERO and $\overline{F2}$ is ONE). If the central control means now provides the mode indicating signals M1 to M4, then, regardless of the present coded output signal of FLIP-FLOPS 204 and 205, at least one of the STROKE gates 212 or 214 or 216 or 218 will supply a ZERO signal to STROKE gate 221 such that the first control signal EX will be a ONE, as previously explained. This EX signal, with a load mode signal LM from the central control means appears at each of the STROKE gates 232, 234, 236 and 238 which are then enabled. With the F1 bit a ONE, STROKE gate 232 will provide a ZERO signal to STROKE gate 240 which produces a ONE output signal to the set side of FLIP-FLOP 204 thus making the X1 output signal a ONE and the $\overline{X1}$ output signal a ZERO. By examining the signals on STROKE gate 238, it is seen that a ZERO signal is produced which causes STROKE gate 246 to provide a ONE signal to the reset side of FLIP-FLOP 205 thereby making the $\overline{X2}$ signal a ONE and the X2 signal a ZERO, the coded output signal from both FLIP-FLOPS 204 and 205 thus representing a mode 2 operation in accordance with the above table. Another method of changing mode states is accomplished by the use of STROKE gates 248, 250, 252 and 254. It is seen that each of these STROKE gates receives the EX signal from STROKE gate 221, a TZ signal from the central control means 10 indicating that a transfer to a new mode is to be made, and a signal indicative of a predetermined condition within the processing element, which signal is given by way of example as the $\overline{K}$ signal from the FLIP-FLOP 220 of FIG. 6C. In addition, each of these STROKE gates receives a mode setting signal from the central control means, with the STROKE gate 248 receiving an MC2 signal, indicating a mode 2 operation, STROKE gate 250 receiving a MC1 signal, indicating a mode 1 operation, STROKE gate 252 receiving a MC4 signal indicating a mode 4 operation and STROKE gate 254 receiving a MC3 signal indicating a mode 3 operation. Assuming that the EX, TZ, and $\overline{K}$ signals are ONES, the presence of a MC2 signal on STROKE gate 248 will cause a ZERO output signal to be provided to STROKE gates 240 and 246 to thereby set the FLIP-FLOPS 204 and 205 such that the X1 output signal is a ONE and the $\overline{X2}$ output signal is a ONE indicating a mode 2 operation. In a similar manner, if the MC1 signal to STROKE gate 250 is made a ONE, a ZERO output signal will be provided to STROKE gates 242 and 246 to set the FLIP-FLOPS 204 and 205 to provide a coded output signal indicating a mode 1 operation. Similarly, if MC4 is made a ONE, the ZERO output signal provided by STROKE gate 250 will cause STROKE gates 240 and 244 to set the FLIP-FLOPS 204 and 205 to indicate a mode 4 type of operation and if the MC3 signal to STROKE gate 254 is made a ONE, a ZERO output signal will be provided to STROKE gates 242 and 244 to set the FLIP-FLOPS 204 and 205 to represent a mode 3 type of operation.

In order to illustrate the mode setting function, consider, by way of example, a case in which the processing element shown is in a mode 2 state of operation and it is desired to switch it to a mode 4 state of operation if a predetermined condition is met. One such type of predetermined condition may be to switch the present mode to a new desired mode if a particular bit in one of the memory frames 20 or 30 is a ONE. This operation is accomplished in the following manner; with the C signal from the operation selection means 47 having a value of ONE, the CTO signal to STROKE gate 228 of FIG. 6C is made a ONE causing a ZERO output signal to STROKE gate 222 which then sets the carry FLIP-FLOP 220 such that K is a ONE and $\overline{K}$ is a ZERO. The particular bit is then read out of the frame 1 memory 20 and routed to the operation selection means 47 by the routing means 45, where the bit is complemented and the complement is routed through as the $a$ signal. Thus, if the bit was originally a ZERO, the $a$ signal will be a ONE and the $\overline{a}$ signal will be a ZERO, and if the bit was originally a ONE the $a$ signal will be a ZERO and the $\overline{a}$ signal will be a ONE. By proper control signals to the operation selection means 47, the $\overline{b}$ signal will be a ZERO and the $\overline{b}$ signal will be a ONE. At this time, the AZ and EO signals from the central control means are made ONES, and by examining the signals on the STROKE gates of FIG. 6C it may be seen that if the bit read out of the frame 1 memory 20 was a ONE, STROKE gate 190 receives all ONE input signals (recalling that the bit was complemented and $a$ would be a ZERO $\overline{a}$ would be a ONE) to thereby cause STROKE gate 190 to provide a ZERO input signal to STROKE gate 224 which then resets the carry FLIP-FLOP 220 such that the $\overline{K}$ signal is a ONE and the K signal is a ZERO. The ONE value $\overline{K}$ signal appears on STROKE gates 248, 250, 252 and 254 to indicate that the predetermined condition has been met. At this time, the transfer signal TZ is made a ONE and the desired mode setting signal MC4 is made a ONE. In the present example, it was stated that the processing element is in mode 2, and if the mode indicating signal M2 from the central control means is made a ONE, STROKE gate 216 will produce a ZERO output signal causing STROKE gate 221 to provide the first control signal EX which causes STROKE gate 252 to set the mode FLIP-FLOPS 204 and 205 to provide an output signal indicating a mode 4 operation as was previously described. If, on the other hand, the central control means supplied a mode indicating M1 signal or M3 signal or M4 signal, the EX signal from STROKE gate 221 will not be generated since the mode addressed was not identical to the mode represented by the coded output signals from FLIP-FLOPS 204 and 205. If, the bit in the frame 1 memory 20 was a ZERO, STROKE gate 190 would not provide a ZERO signal to STROKE gate 224 and the carry FLIP-FLOP 220 would remain set, such that the $\overline{K}$ signal would be a ZERO, and STROKE gate 252 would not cause the FLIP-FLOPS 204 and 205 to provide a coded output signal indicating a mode 4 type operation. Additional predetermined conditions may be to transfer to a certain mode of operation if a bit tested is a ZERO; if a word tested is a ZERO; if the comparison of two words is positive, or negative; to name a few.

The various methods of providing a coded output signal to indicate a certain mode of operation, and the switching of these modes of operation are not limited to those herein described. By way of example, counter or register means may be provided and arranged to be responsive to a predetermined internal condition to switch to a next mode in sequence if a predetermined condition is met. The mode control unit 42 affords the computer the ability to work on various portions of a problem without the need for each processing element in the computer array to do that which is instructed by the central control means. If a command designated by the instruction designates an addition in mode 2 only, then only those processing elements which are in mode 2 will add, and those processing elements in other modes will return any information back into the memory frames unaltered regardless of the fact that all external signals from the central control means to the processing element are identical. This may be demonstrated in the following example: suppose that an instruction designates an addition of a word in frame 1 to a word in frame 2 with the result to be stored in frame 1. The bits of the word from the frame 1 and frame 2 memory are read out, processed through the logic and arithmetic unit 38 where they are added, and the result S1 (for each bit added) appears at STROKE gates 99 and 104 of the frame selection means 40. Suppose further that only processing elements in mode 1 or 2 are to perform this operation. The central control means provides the mode indicating signals M1 and M2 and if the particular processing element is in one of these modes, the control signal EX will be generated and is fed to STROKE gates 81 and 83 of the frame selection means 40. With the CC1 signal a ZERO and the CC2 signal a ONE, STROKE gate 81 is enabled by the presence of the EX signal to cause STROKE gate 85 to produce a ZERO C1 signal and STROKE gate 88 to provide a ONE C2 signal which causes STROKE gate 99 to route the sum into the frame 1 memory 20 and STROKE gate 102 to route the frame 2 bits back to the frame 2 memory 30. If the particular processing element shown was in mode 3 or 4, the first control signal EX would not be generated, STROKE gates 81 and 83 would be blocked, such that any information read out of the frame 1 memory 20 is returned and any information read out of the frame 2 memory is returned, thus altering the instruction as designated by the CC1 and CC2 signals. The first control signal EX is shown herein to alter the routing signals CC1 and CC2; it is to be understood that the EX signal may be utilized to alter other control signals from the central control means or other portions of the processing element. By way of example, the first control signal may be utilized to control the reading and writing of bits from the memory frames, govern the operation of the logic and arithmetic unit 38, or govern the operation of the routing means 45 such that the routing of a particular bit may be to a neighboring processing element other than that specified by central control. The invention described herein is equally applicable in a parallel network system having a plurality of control units, and in that instance only processing elements in particular modes will carry out the instructions as designated by a particular control unit, and "control means" is intended to mean one or more control units.

The parallel network computer with the mode control means just described finds utility in the solution of a great many mathematical problems, one of which is the numerical solution of partial differential equations. One such solution will now be described to illustrate the functioning of the parallel network computer and the mode control means of the invention. It is required to find the solution of the following Laplace equation;

$$\nabla^2 U(x, y) = 0$$

In the solution of this problem, consider a region R of the $x$–$y$ plane, with the region R having a boundary C which is a simple closed curve. For the purposes of numerical computation, the problem is approximated as follows: the $x$–$y$ plane is replaced by a net of square meshes having sides $h$. The points of intersection of sides $h$ are called nodes, and reference is now made to FIG. 7 which better clarifies this statement.

Figure 7:
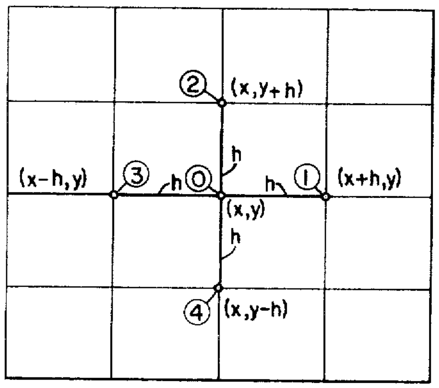
FIG. 7 is a graph to aid in the derivation of a Laplace equation.

In FIG. 7, there is shown five points labeled 0, 1, 2, 3 and 4 with the point $(x, y)$ being a node point. The distance from point 0 to point 1 is $h$ and in similar fashion the distance between points 0 and 2, 0 and 3 and 0 and 4 is $h$. By continuing the mesh, it may be demonstrated that points 1, 2, 3 and 4 are also node points having four nearest neighbors, however for purposes of clarity the equation with respect to only node point 0 $(x, y)$ will be demonstrated. Since the 0 point is defined as $(x, y)$, point 1 therefore will be $(x+h, y)$, point 2 will be $(x, y+h)$, point 3 will be $(x-h, y)$, and point 4 will be $(x, y-h)$. The configuration of FIG. 7 will be utilized in the solution of the above Laplace equation:

$$\nabla^2 U(x, y) = 0$$

where $$\nabla^2 \equiv \frac{\partial^2}{\partial x^2} + \frac{\partial^2}{\partial y^2}$$

and $$\frac{\partial^2 U}{\partial x^2} + \frac{\partial^2 U}{\partial y^2} = 0$$

The following derivation is utilized to obtain the value of U at a typical point 0 $(x, y)$ in terms of the four nearest neighbor points, 1, 2, 3 and 4. It may be demonstrated that U at points 1, 2, 3 and 4 is equal to the following:

$$U_1 = U(x+h, y) = U(x, y) + \left.\frac{\partial U}{\partial x}\right|_{xy}^{h} + \left.\frac{\partial^2 U}{2\,\partial x^2}\right|_{xy}^{h^2} + \left.\frac{1}{6}\frac{\partial^3 U}{\partial x^3}\right|_{xy}^{h^3} + \cdots \quad \text{(Eq. 1)}$$

$$U_2 = U(x, y+h) = U(x, y) + \left.\frac{\partial U}{\partial y}\right|_{xy}^{h} + \left.\frac{1}{2}\frac{\partial^2 U}{\partial y^2}\right|_{xy}^{h^2} + \left.\frac{1}{6}\frac{\partial^3 U}{\partial y^3}\right|_{xy}^{h^3} + \cdots \quad \text{(Eq. 2)}$$

$$U_3 = U(x-h, y) = U(x, y) - \left.\frac{\partial U}{\partial x}\right|_{xy}^{h} + \left.\frac{1}{2}\frac{\partial^2 U}{\partial x^2}\right|_{xy}^{h^2} - \left.\frac{1}{6}\frac{\partial^3 U}{\partial x^3}\right|_{xy}^{h^3} + \cdots \quad \text{(Eq. 3)}$$

$$U_4 = U(x, y-h) = U(x, y) - \left.\frac{\partial U}{\partial y}\right|_{xy}^{h} + \left.\frac{1}{2}\frac{\partial^2 U}{\partial y^2}\right|_{xy}^{h^2} - \left.\frac{1}{6}\frac{\partial^3 U}{\partial y^3}\right|_{xy}^{h^3} + \cdots \quad \text{(Eq. 4)}$$

Adding Equations 1, 2, 3 and 4; it is seen that the left hand members equal $U_1+U_2+U_3+U_4$. The first term of the right hand members$=4U(x,y)$ and since $U(x,y)=U_0$ (point $(x,y)$ is point 0), $4U(x,y)=4U_0$. Adding the second term members;

$$\left.\frac{\partial U}{\partial x}\right|_{xy}^{h} - \left.\frac{\partial U}{\partial x}\right|_{xy}^{h} = 0 \text{ and } \left.\frac{\partial U}{\partial y}\right|_{xy}^{h} - \left.\frac{\partial U}{\partial y}\right|_{xy}^{h} = 0$$

so the second term members drop out.

Adding the third term members;

$$\left.\frac{1}{2}\frac{\partial^2 U}{\partial x^2}\right|_{xy}^{h^2} + \left.\frac{1}{2}\frac{\partial^2 U}{\partial x^2}\right|_{xy}^{h^2} = \left.\frac{\partial^2 U}{\partial x^2}\right|_{xy}^{h^2}$$

and $$\left.\frac{1}{2}\frac{\partial^2 U}{\partial y^2}\right|_{xy}^{h^2} + \left.\frac{1}{2}\frac{\partial^2 U}{\partial y^2}\right|_{xy}^{h^2} = \left.\frac{\partial^2 U}{\partial y^2}\right|_{xy}^{h^2}$$

since $$\frac{\partial^2 U}{\partial x^2}+\frac{\partial^2 U}{\partial y^2}=0$$

the third term members drop out.

Terms involving some higher powers of $h$ eventually do not drop out and these may be represented by H, so the result of adding Equations 1, 2, 3 and 4 is:

$$U_1+U_2+U_3+U_4=4U_0+H \qquad \text{(Eq. 5)}$$

if $h$ is made very small, the H term is approximately zero so Equation 5 reduces to:

$$U_0=\tfrac{1}{4}[U_1+U_2+U_3+U_4] \qquad \text{(Eq. 6)}$$

Equation 6 is the well known 5 point formula for the numerical solution at interior points in a mesh, and is utilized in the solution of mathematical problems in such areas as numerical weather forecasting, nuclear reactor calculations, heat flow where the known boundary conditions would be the temperature on the boundary of a body under examination, deflection and stress problems, diffusion problems, and electrical problems where the boundary conditions may represent an electric or magnetic field on the boundary of the body under examination. Basically, the $U_0$ in Equation 6 represents the value of a function at a certain point and is equal to the arithmetic average of the value of its four nearest neighbors. To demonstrate the operation of the computer herein with respect to the solution of a problem involving the Laplace equation, reference should now be made to FIGS. 8 and 9.

Figure 8:
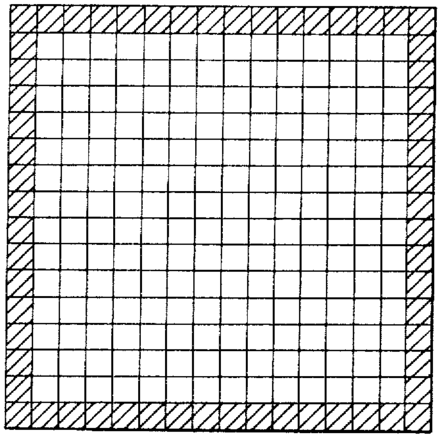
FIG. 8 illustrates an array of processing elements arranged to perform certain computations.
Figure 9:
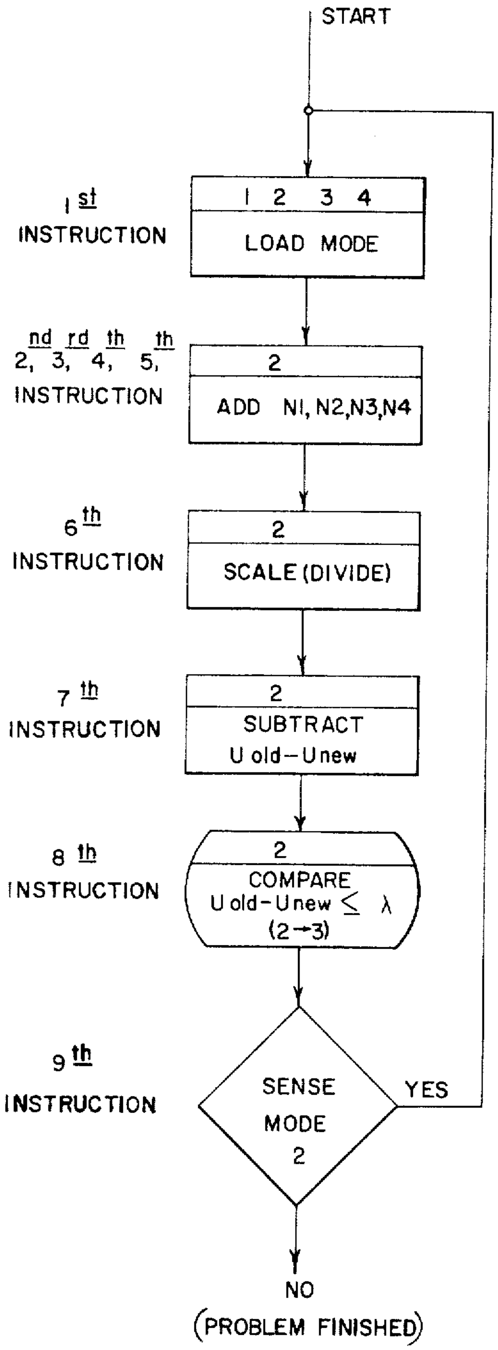
FIG. 9 is a computer instruction flow chart illustrating the solution of a problem.

For purposes of illustration, an electrical problem will be described wherein the electric field within an "O" channel guide is to be computed, with the field at the "O" channel boundary being known. The processing element array is loaded with data indicative of a particular mode of operation for each processing element and the values of the boundary condition. FIG. 8 shows such an array with each small square representing individual processing elements. The first instruction of FIG. 9 is addressed to processing elements in modes 1 or 2 or 3 or 4, and all of the processing elements in the array will carry out the instruction "load mode." This instruction causes each processing element to select a specified bit of FIG. 6B. FIG. 8 shows the "mode map" thus obtained with the boundary processing elements (shaded) around the edge of the array set to mode 1 and all other processing elements within the boundary set to mode 2. The second, third, fourth and fifth instructions in FIG. 9 are addressed to all processing elements in mode 2 only and are add instructions. These sequential instructions cause all processing elements in mode 2 to add the values stored in its four nearest neighbors, the result being equal to $U_1+U_2+U_3+U_4$. The sixth instruction is addressed to all processing elements in mode 2 and is a scale instruction. This causes each processing element to divide the result obtained from the second, third, fourth and fifth instructions by 4, the result of which will be $U_0$, which is stored in a particular memory location. The seventh instruction is addressed to all processing elements in mode 2 and is a subtract instruction. The $U_0$ obtained as a result of the sixth instruction will be termed $U_{new}$ and is compared with the results of a previous calculation, which in the present example would be zero, except for the processing elements adjacent the boundary processing elements, which have the known value of the field at the boundary stored within their associated memories. The eighth instruction causes the result of the subtraction to be compared with a common limit, or tolerance lambda ($\lambda$) and if the result is equal to or less than lambda, the processing element will switch to mode 3, that is, the MC3 signal to STROKE gate 254 of FIG. 6B is energized, the mode indicating signal M2 to STROKE gate 216 is energized to obtain the first control signal EX, the TZ signal to STROKE gate 254 is energized and if the condition is met that is, if $U_{old}-U_{new}$ is equal to or less than lambda, the $\overline{K}$ signal will be energized such that STROKE gate 254 will switch the processing element to a mode 3 operation as previously described. It might be mentioned that the $U_{new}$ obtained then is stored in a specific location in the memory portion of the processing element where it becomes a $U_{old}$ for the next iteration. The ninth instruction shown is a sense mode instruction which causes the computer to test to see if any processing elements have switched to mode 3. If all of the processing elements have switched to mode 3, that is, no processing element is in mode 2, the operation is complete since the common limit lambda has been met by all processing elements. If all or some of the processing elements are still in mode 2, the process begins again with the first instruction, addressing processing elements in modes 1, 2, 3 and 4 to again load the initial "mode map." The foregoing instructions are subsequently repeated until, after the ninth instruction, there are no processing elements in mode 2, indicating completion of the problem. As an alternative, an estimation as to the field within the boundary may be made and these values stored within the processing elements. In this manner, each of the processing elements will have stored within itself a $U_{old}$ and a correct solution may be arrived at with fewer repetitions of the instructions.

It may be seen that the mode control means offers the parallel network computer the capability of performing a great variety of functions. For example, different processing elements in the array may be assigned modes 1 or 2 or 3 or 4 and in this manner different portions of the array may be used to calculate different portions of a problem. Additionally, the mode control means affords the parallel network computer the capability to place chosen processing elements in a certain mode of operation to define certain boundary conditions as exemplified in the above problem. In orbiting satellite, and radar tracking problems, the mode control means allows individual, or subsets of processing elements to keep track of individual targets.

Accordingly, there has been provided control means for a parallel network computer which allows the processing elements of the computer to alter control signals from a central control means such that the individual processing elements will carry out the instruction commanded only if certain predetermined conditions are met.

Although the present invention has been described with a certain degree of particularity, it should be understood that the present disclosure has been made by way of example and that changes in the combination and arrangement of parts obvious to one skilled in the art, may be resorted to without departing from the scope and spirit of the invention.

We claim as our invention:

1. In a computer having a plurality of processing elements under simultaneous control of central control means and receiving identical control signals therefrom, the improvement comprising:

circuit means associated with said processing elements and responsive to internal conditions within said processing elements for selectively altering any of said control signals to thereby allow a processing element to be in a different mode of operation than other processing elements of said plurality.

2. In a computer having a plurality of processing elements under simultaneous control of central control means and receiving identical control signals therefrom, the improvement comprising:

(1) coding means associated with individual processing elements for indicating a particular mode of operation of the processing element;

(2) decoding means responsive to said coding means and preselected mode indicating signals from said control means for providing an internal control signal for enabling the processing element to carry out the command specified by said control signals.

3. A computer comprising:
(1) central control means;
(2) an array of processing elements for receiving identical control signals from said central control means to carry out commands specified by said control signals;
(3) each said processing element including:
(a) coding means for providing a coded output signal, with a particular coding representing a particular mode of operation,
(b) decoding means for receiving mode indicating signals from said central control means and said coded output signal for providing a first control signal if said coded output signal represents the same mode as a mode indicating signal,
(c) input means for receiving mode setting signals from said central control means and responsive to predetermined conditions within said processing element to set said coding means to thereby provide a coded output signal in accordance with the mode designated by one of said mode setting signals if said predetermined conditions are met.

4. A computer comprising:
(1) central control means;
(2) an array of processing elements for receiving control signals from said central control means to carry out commands specified by said control signals;
(3) each said processing element including:
(a) memory means for storing bits of information,
(b) means for carrying out operations specified by said central control means;
(4) circuit means associated with said processing elements;
(5) said circuit means including:
(a) register means responsive to said control means and conditions internal to its associated processing element for providing a plurality of output signals to thereby indicate different modes of operation,
(b) means for storing the state of said output signals in said memory means,
(c) means for setting said register means in accordance with information stored in said memory means,
(d) decoding means responsive to the output signals provided by said register means and mode indicating signals from said central control means for providing a first control signal to allow the processing element to carry out the command specified by said central control means, said first control signal being generated if the mode of operation indicated by said output signals from said register means is identical to the mode of operation indicated by said mode indicating signals.

5. In a computer having at least one processing element arranged in a network to receive control signals from a central control means to carry out commands specified by said control signals, the improvement comprising:
(1) means associated with said processing element for providing a plurality of coded output signals, with each said output signal representing a different mode of operation; and
(2) means responsive to a coded output signal and a predetermined condition of said processing element to change said coded output signal if said predetermined condition is met.

6. A computer comprising:
(1) central control means;
(2) a plurality of processing elements for receiving identical control signals from said central control means;
(3) each said processing element including:
(a) memory means for storing information,
(b) means for carrying out operations specified by said control signals,
(c) gating means for directing the results of said operations to said memory means, and
(d) circuit means responsive to predetermined conditions within said processing element for providing an enabling signal to said gating means if said conditions are met.

7. A computer comprising:
(1) central control means;
(a) a plurality of processing elements for receiving identical control signals from said central control means;
(2) each said processing element including,
(a) first and second memory frames,
(b) means for performing predetermined operations on information stored in said memory frames,
(c) frame selection means for gating the results of any of said operations into a preselected one of said memory frames,
(d) coding means for providing an output signal indicative of a certain mode of operation of said processing element,
(e) decoding means responsive to said output signal and at least one mode indicating signal from said central control means for providing a first control signal if said mode indicating signal represents the same mode of operation as said output signal, said first control signal operatively associated with said frame selection means to enable said frame selection means; and
(f) means responsive to data contained within said processing element for changing said output signal to represent a different mode of operation.

8. A computer comprising:
(1) central control means;
(2) an array of processing elements for receiving identical control signals from said central control means for carrying out operations specified by said control signals; and
(3) circuit means responsive to predetermined conditions of said processing elements to allow preselected processing elements to alter said control signals if said conditions are met.

9. A computer comprising:
(1) a plurality of central control units:
(2) an array of processing elements for receiving control signals from said central control units for carrying out commands specified by said control signals;
(3) circuit means responsive to predetermined control signals and predetermined conditions of said processing elements to place certain processing elements in certain modes of operation such that different processing elements may be responsive to different control units of said plurality, dependent upon said mode of operation.

References Cited by the Examiner

UNITED STATES PATENTS 3,061,192 10/1962 Terzian ---------- 340—172.5

ROBERT C. BAILEY, *Primary Examiner.*

G. D. SHAW, *Assistant Examiner.*